June 16, 1942. A. J. HAINES 2,286,959
HIGHWAY TRAFFIC POST
Filed Jan. 27, 1941
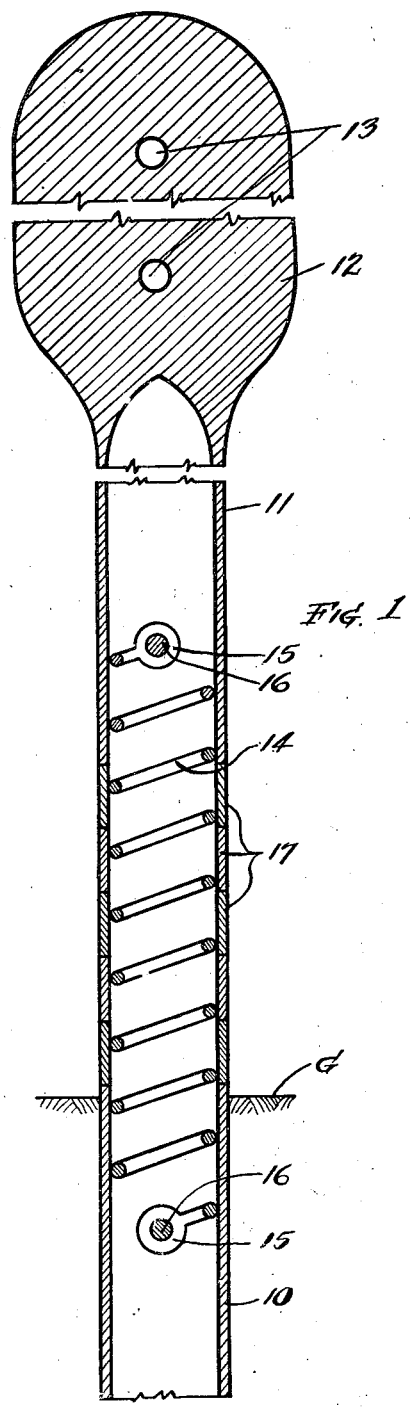
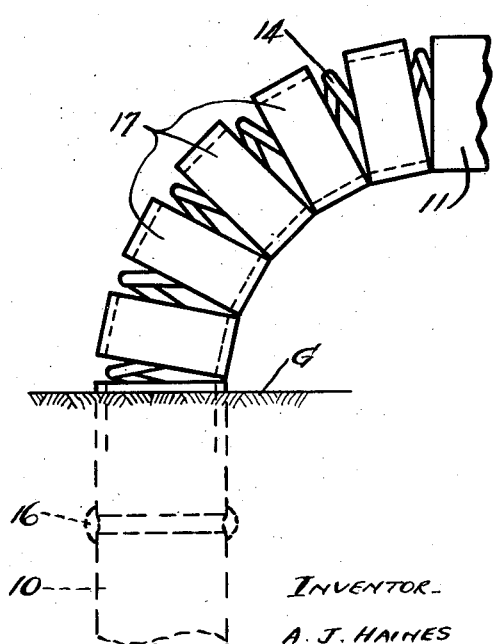
INVENTOR.
A. J. HAINES
BY
Kimmel & Crowell
ATTORNEYS Patented June 16, 1942

2,286,959

UNITED STATES PATENT OFFICE 2,286,959

HIGHWAY TRAFFIC POST

Archie J. Haines, Jordan, Ontario, Canada

Application January 27, 1941, Serial No. 376,208

3 Claims. (Cl. 189—23)

My invention relates to a sign post.

More particularly, the invention is used to hold highway markers, which, as is well known, are subjected to a great deal of abuse, as when a vehicle collides with a marker, for instance.

The objects of the invention, generally, are the improve on known sign posts, especially posts holding highway markers.

A specific object of the invention is to provide a strong but flexible sign post, especially a post for holding a highway marker. Should a vehicle collide with the post, it will give or yield to impact, but will not be damaged thereby, and will later assume its normal or upright position.

In the drawing, wherein like numerals of reference indicate corresponding parts in the various figures, Figure 1 is a fragmentary, part section, part elevation of a sign post made in accordance with my invention;

Figure 2 is a fragmentary elevation of the post when flexed out of normal upright position, as when it is being run over by the wheel of a vehicle.

Referring now by numerals to the drawing, 10 is a pipe section, preferably of metal, which is suitably anchored in the ground G. 11 is a second pipe section, also preferably of metal, spaced from the pipe section 10. The upper end of the pipe section 11 may be flattened as at 12, the flattened portion having apertures 13 adapted to receive bolts or the like by which a sign, marker, or the like may be fastened to the upper end of the pipe section 11. The sections 10 and 11 are operatively connected together to form the post complete, by a flexible coupling or connection which may take, as shown, the form of a helical spring 14. The opposite ends of the spring are formed with loops or eyes 15, each adapted to receive a rivet bolt or the like 16, passed through the pipe section 10 or 11, as the case may be, to thus secure such end of the spring to its associated pipe section.

As best shown in Figure 1, the rivets 16 are positioned some distance from the adjacent ends of the pipe sections, respectively, so that a number of coils of the spring will be housed within the pipe section 10 or 11, as the case may be. Thus, the upper or second pipe section 11 will normally be held in an upright position in alignment with the lower or base pipe section 10, but will be capable of being bodily moved out of alignment as the spring coupling yields.

As shown, a number of rings 17, also preferably of metal, are used to fill the gap or intervening space between the adjacent ends of the pipe sections 10 and 11, to thus normally shield or cover that portion of the spring which lies between such ends. The number of rings, and their size or height, are such that when they are in operative position as shown, the spring will be under tension. The rings will therefore engage one another in superposed relationship, and the upper pipe section 11 and rings 17 will be held in their intended vertical position in alignment with the lower pipe section 10. The outside or over-all diameter of the spring is preferably such that the spring will be slightly compressed when in operative position within the pipe sections and rings, so that the spring will tightly engage the wall of such sections and rings.

It will be seen that while the pipe section 11 will normally be held in upright or vertical position in alignment with the pipe section 10, the section 11 will be capable of being bodily turned out of alignment as the portion of the spring lying between the adjacent ends of the sections yields or flexes. Thus, any vehicle colliding with the pipe section 11 or the sign secured thereto, will cause the pipe section 11 to bodily move out of alignment. When released, this pipe section will again be brought back to its normal or vertical position by the action of the spring.

In practice, the rings will only extend a short distance from the ground, and the distance between the ground and the top of the section 11 will be taken mostly by this pipe section.

I claim:

1. A supporting post assembly comprising a series of superimposed hollow metallic sections including a base section, an intermediate section and an upper section, said upper section having an enlarged solid flat-faced head portion adapted for attachment of a sign or like indicator thereto and having a hollow shank portion, said shank portion having means extended therethrough for anchoring therewithin one end of an elongated spiral spring element, said base section adapted to be embedded in the ground or other supporting surface and having extended therethrough an anchoring means for the other end of said spring element, and an elongated spiral spring element extending through said series of sections and into said upper and base sections in abutting relation thereto, the ends of said element being anchored respectively within and to said upper and base sections by said anchoring means, each spiral adjacent a line of division between sections contacting two adjacent sections to thereby maintain the sections in axial alignment.

2. The invention as set forth in claim 1 wherein the spring element has an eye at each end thereof through which the anchoring means extends for securing said element to said upper and base sections respectively.

3. A supporting post assembly comprising a series of superimposed axially aligned hollow metallic sections including a head section, an intermeddiate section and a base section, an elongated spiral spring element for extension through said sections and into said upper and said base sections, the said latter sections being formed with hollow receiving chambers for the ends of said element, and means for anchoring said element to said respective sections, each spiral of said spring element adjacent a line of division between sections contacting two adjacent sections and thereby maintaining the several sections in axial alignment.

A. J. HAINES.